(12) United States Patent
Miura et al.

(10) Patent No.: US 12,188,678 B2
(45) Date of Patent: Jan. 7, 2025

(54) AIR CONDITIONER AND CONTROL METHOD

(71) Applicant: Carrier Japan Corporation, Tokyo (JP)

(72) Inventors: Ken Miura, Fuji (JP); Tetsuma Hamashima, Fuji (JP); Katsuhiro Shimizu, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 177 days.

(21) Appl. No.: 17/695,326

(22) Filed: Mar. 15, 2022

(65) Prior Publication Data

US 2022/0205675 A1 Jun. 30, 2022

Related U.S. Application Data

(63) Continuation of application No. PCT/JP2019/036328, filed on Sep. 17, 2019.

(51) Int. Cl.
*F24F 11/89* (2018.01)
*F24F 3/06* (2006.01)
(Continued)

(52) U.S. Cl.
CPC .............. *F24F 11/89* (2018.01); *F24F 3/065* (2013.01); *F24F 11/42* (2018.01); *F25B 5/02* (2013.01);
(Continued)

(58) Field of Classification Search
CPC .. F24F 11/89; F24F 11/42; F24F 11/43; F24F 11/41; F24F 3/065; F25B 5/02;
(Continued)

(56) References Cited

U.S. PATENT DOCUMENTS

2016/0245536 A1* 8/2016 Iwasaki .................. F25B 49/02
2019/0154321 A1   5/2019 Takenaka et al.

FOREIGN PATENT DOCUMENTS

CN      105247302 A    1/2016
CN      106104178 A   11/2016
(Continued)

OTHER PUBLICATIONS

International Search Report issued Nov. 12, 2019 in PCT/JP2019/036328 filed on Sep. 17, 2019, 4 pages (with English Translation).
(Continued)

*Primary Examiner* — Miguel A Diaz
(74) *Attorney, Agent, or Firm* — Oblon, McClelland, Maier & Neustadt, L.L.P.

(57) ABSTRACT

An air conditioner of an embodiment includes a plurality of outdoor units, one or more indoor units, and a control unit. The outdoor unit includes a compressor, a four-way valve, an outdoor heat exchanger, an outdoor expansion valve and an outdoor blower, and the outdoor units exchange heat between the outside air and a refrigerant. The indoor unit is an indoor unit connected to the plurality of outdoor units by a refrigerant pipe, includes an indoor heat exchanger, an indoor expansion valve, and an indoor blower, and exchanges heat between the indoor air and the refrigerant. The control unit controls the plurality of outdoor units and the one or more indoor units. The control unit controls the condensation pressure of the outdoor unit in a heating operation or the suction pressure of the outdoor unit in a defrosting operation to be equal to or smaller than an upper limit pressure, which is 1/1.5 times the rated maximum pressure during the heating operation when any of the outdoor units is in the defrosting operation.

9 Claims, 4 Drawing Sheets

(51) Int. Cl.
   *F24F 11/42*   (2018.01)
   *F25B 5/02*    (2006.01)
   *F25B 47/02*   (2006.01)
   *F24F 140/12*  (2018.01)

(52) U.S. Cl.
   CPC ........ *F25B 47/025* (2013.01); *F24F 2140/12* (2018.01); *F25B 2313/0233* (2013.01); *F25B 2313/0253* (2013.01); *F25B 2700/1931* (2013.01); *F25B 2700/1933* (2013.01)

(58) Field of Classification Search
   CPC ...... F25B 6/02; F25B 47/025; F25B 2140/12; F25B 2313/0233; F25B 2313/0253; F25B 2313/02332; F25B 2313/02333; F25B 2313/0251; F25B 2700/1931; F25B 2700/1933; F25B 2700/19; F25B 2600/027; F25B 2600/0271; F25B 2600/0272
   See application file for complete search history.

(56) References Cited

FOREIGN PATENT DOCUMENTS

| | | |
|---|---|---|
| CN | 107709886 A | 2/2018 |
| JP | 07-332815 A | 12/1995 |
| JP | 2001-355933 A | 12/2001 |
| JP | 2007-271094 A | 10/2007 |
| JP | 2008-025901 A | 2/2008 |
| JP | 2014-211251 A | 11/2014 |
| WO | WO 2017/006596 A1 | 1/2017 |

OTHER PUBLICATIONS

Combined Chinese Office Action and Search Report issued Feb. 10, 2023, in corresponding Chinese Patent Application No. 201980100386.4 (with English Translation), 22 pages.

* cited by examiner

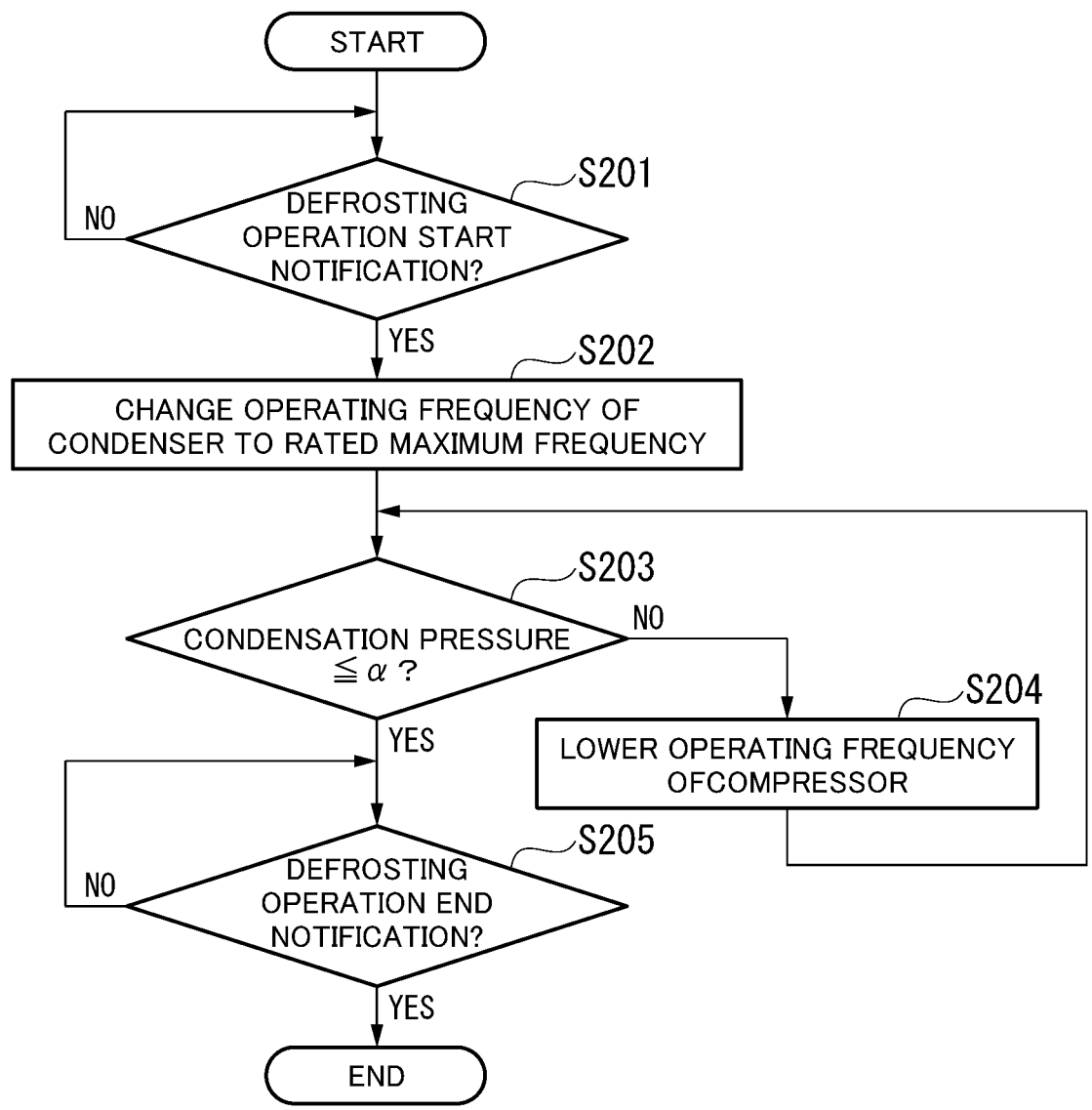

AIR CONDITIONER AND CONTROL METHOD

CROSS-REFERENCE TO RELATED APPLICATION

Priority is claimed on PCT Patent Application No. PCT/JP2019/036328, filed Sep. 17, 2019, the content of which is incorporated herein by reference.

FIELD

Embodiments described herein relate generally to an air conditioner and a control method.

BACKGROUND

Conventionally, a technique for realizing a defrosting operation by switching a four-way valve so that one outdoor unit functions as a condenser and the other outdoor unit functions as an evaporator during a heating operation of an air conditioner including two outdoor units is known. However, in the defrosting operation realized by such a method, since the suction pressure of the compressor on the outdoor unit (hereinafter referred to as "defrosting unit") side to be defrosted increases, the likelihood that the compressor will break down may increase.

BRIEF DESCRIPTION OF THE DRAWINGS

FIG. 4 is a second flowchart showing a specific example of the flow of the condensation pressure control process performed by the air conditioner of the first embodiment.

DETAILED DESCRIPTION

Hereinafter, an air conditioner and a control method of the embodiment will be described with reference to the drawings.

First Embodiment

Figure 1:
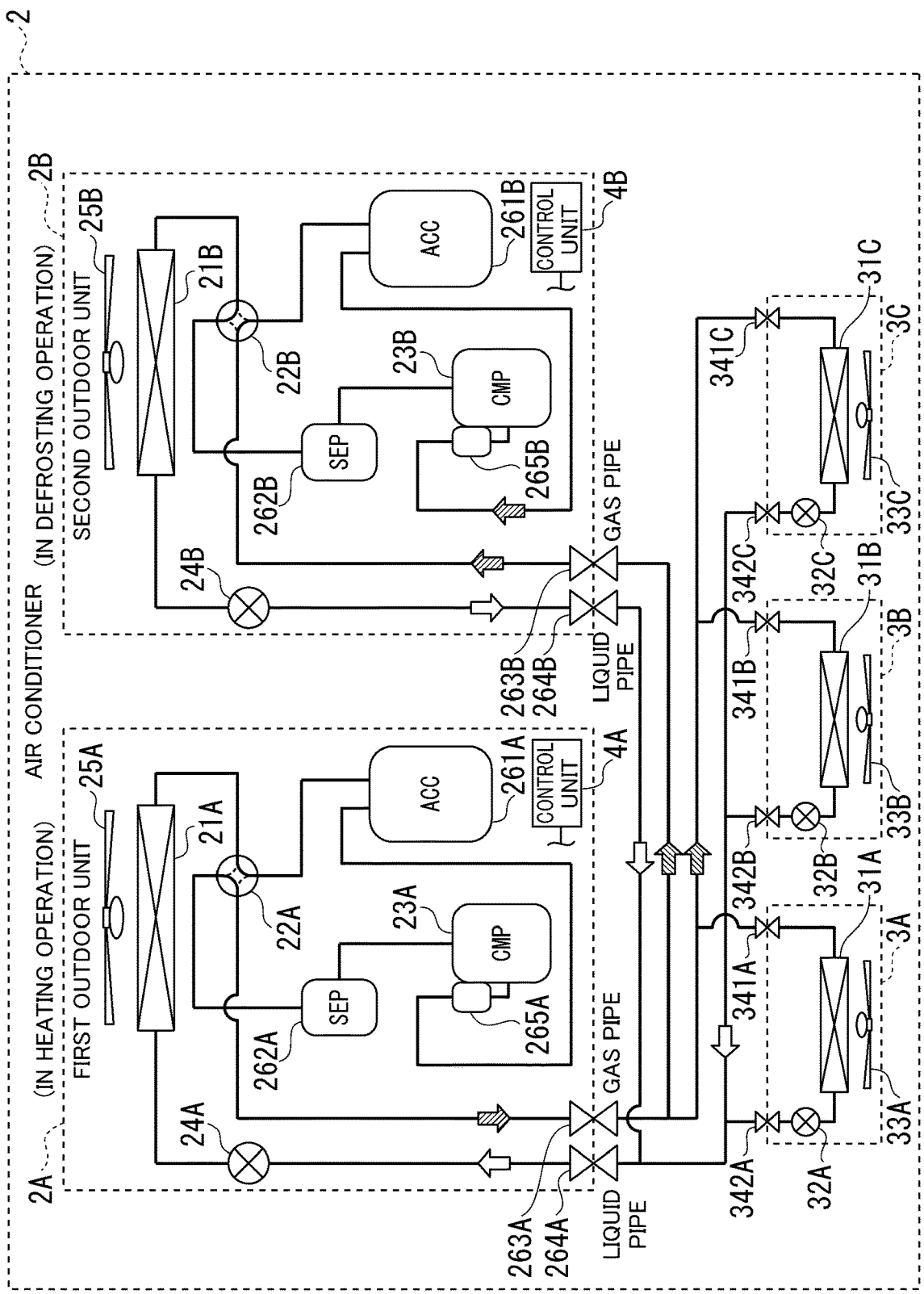
FIG. 1 is a diagram showing a specific example of the configuration of an air conditioner according to a first embodiment.

FIG. 1 is a diagram showing a specific example of the configuration of an air conditioner 1 according to the first embodiment. The air conditioner 1 includes a first outdoor unit 2A, a second outdoor unit 2B, a first indoor unit 3A, a second indoor unit 3B, and a third indoor unit 3C. Unless otherwise specified below, the first outdoor unit 2A and the second outdoor unit 2B are referred to as the outdoor unit 2. However, when it is necessary to distinguish the functional units included in the first outdoor unit 2A and the second outdoor unit 2B, the outdoor units 2 are similarly distinguished by adding "A" or "B" to the number of the reference sign representing the functional units. Similarly, unless otherwise specified below, the first indoor unit 3A, the second indoor unit 3B, and the third indoor unit 3C are referred to as the indoor unit 3. However, when it is necessary to distinguish the functional units included in the first indoor unit 3A, the second indoor unit 3B, and the third indoor unit 3C, the indoor units 3 are similarly distinguished by adding "A," "B," or "C" to the number of the reference sign representing the functional unit.

The outdoor unit 2 takes in outdoor air (hereinafter referred to as "outside air") and exchanges heat between the taken-in outside air and the refrigerant. Similarly, the indoor unit 3 takes in indoor air (hereinafter referred to as "inside air") and exchanges heat between the taken-in inside air and the refrigerant.

Specifically, the outdoor unit 2 includes an outdoor heat exchanger 21, a four-way valve 22, a compressor 23, an outdoor expansion valve 24, an outdoor blower 25, and a control unit 4. The outdoor heat exchanger 21 exchanges heat between the refrigerant supplied from the indoor unit 3 and the outside air. For example, the outdoor heat exchanger 21 is a finned tube type heat exchanger. For example, FIG. 1 shows a state in which the first outdoor unit 2A is in a heating operation. In this case, the outdoor heat exchanger 21A of the first outdoor unit 2A functions as an evaporator that takes heat from the outside air into the refrigerant and vaporizes the refrigerant. On the other hand, FIG. 1 shows a state in which the second outdoor unit 2B is in a defrosting operation. In this case, the outdoor heat exchanger 21B of the second outdoor unit 2B functions as a condenser that melts and removes the frost adhering to the outdoor heat exchanger 21B by the high-temperature refrigerant supplied from the first outdoor unit.

The four-way valve 22 is a device that switches the direction in which the refrigerant is circulated inside the air conditioner 1 to either the direction for the heating operation or the direction for the defrosting operation (same as the direction for a cooling operation). The four-way valve 22 switches the circulation direction of the refrigerant according to the instruction of the control unit 4. For example, FIG. 1 shows a state in which the circulation direction of the refrigerant is switched to the direction for the heating operation by the four-way valve 22A. In this case, the four-way valve 22A connects the outdoor heat exchanger 21A to the suction side (accumulator 261A) of the compressor 23A, and connects the discharge side (oil separator 262A) of the compressor 23A to a gas pipe connection portion 263A. On the other hand, FIG. 1 shows a state in which the circulation direction of the refrigerant is switched to the direction for the defrosting operation by the four-way valve 22B. In this case, the four-way valve 22B connects the discharge side (oil separator 262B) of the compressor 23B to the outdoor heat exchanger 21B, and connects the gas pipe connection portion 263B to the suction side (accumulator 261B) of the compressor 23B.

The compressor 23 is a device that compresses and sends out the refrigerant supplied thereto. Specifically, the compressor 23 sucks the refrigerant through a suction cup 265, compresses the refrigerant, discharges the compressed refrigerant, and sends the compressed refrigerant to the indoor unit 3 through the oil separator 262.

The outdoor expansion valve 24 is a device for decompressing the refrigerant. For example, the outdoor expansion valve 24 is an electronic expansion valve (PMV: Pulse Motor Valve), which is a valve device whose opening degree can be changed by an electrical operation. For example, FIG. 1 shows a state in which the outdoor expansion valve 24A in the first outdoor unit 2A during the heating operation decompresses the refrigerant sent from the indoor unit 3 and supplies the cooled refrigerant to the outdoor heat exchanger 21A. On the other hand, FIG. 1 shows a state in which the outdoor expansion valve 24B in the second outdoor unit 2B during the defrosting operation depressurizes the refrigerant sent from the outdoor heat exchanger 21B, and supplies the cooled refrigerant to the first outdoor unit 2A. The cooled refrigerant is heated in the first outdoor unit 2A and supplied to the second outdoor unit 2B again.

The outdoor blower 25 is a device that promotes heat exchange between the refrigerant and the outside air in the outdoor heat exchanger 21 by forcibly sending out the outside air to the outdoor heat exchanger 21. For example, the outdoor blower 25 includes a propeller fan. The fan of the outdoor blower 25 is arranged so as to face the outdoor heat exchanger 21.

The indoor unit 3 includes an indoor heat exchanger 31 and an indoor expansion valve 32. The indoor heat exchanger 31 exchanges heat between the refrigerant supplied from the outdoor unit 2 and the inside air. For example, the indoor heat exchanger 31 is a finned tube type heat exchanger. For example, FIG. 1 shows a state in which the air conditioner 1 is in the heating operation. In this case, the indoor heat exchanger 31 of the indoor unit 3 functions as a condenser that releases the heat of the refrigerant to the inside air to condense the refrigerant.

The indoor expansion valve 32 is a device for decompressing the refrigerant. For example, the indoor expansion valve 32 is an electronic expansion valve (PMV: Pulse Motor Valve), which is a valve device whose opening degree can be changed by an electrical operation. For example, FIG. 1 shows a state in which the indoor expansion valve 32 in the indoor unit 3 during the heating operation decompresses the refrigerant after heat exchange is performed by the indoor heat exchanger 31 and supplies the cooled refrigerant to the outdoor unit 2. The cooled refrigerant is heated in the outdoor unit 2 and supplied to the indoor unit 3 again.

The indoor blower 33 is a device that promotes heat exchange between the refrigerant and the inside air in the indoor heat exchanger 31 by forcibly sending out the inside air to the indoor heat exchanger 31. For example, the indoor blower 33 includes a centrifugal fan. The fan of the indoor blower 33 is arranged so as to face the indoor heat exchanger 31.

The outdoor unit 2 and the indoor unit 3 each include a gas pipe connection portion (263, 341) and a liquid pipe connection portion (264, 342), respectively, and the outdoor unit 2 and the indoor unit 3 are connected via piping through a gas pipe and a liquid pipe.

Although FIG. 1 illustrates the air conditioner 1 including two outdoor units 2 and three indoor units 3, the air conditioner 1 of the embodiment may include a plurality of outdoor units 2 and one or more indoor units 3. That is, the number of outdoor units 2 included in the air conditioner 1 may be three or more. The number of indoor units 3 included in the air conditioner 1 may be one or two, or may be four or more.

The control unit 4 includes a central processing unit (CPU), a memory, an auxiliary storage device, and the like connected by a bus, and executes a program. The control unit 4 controls the operation of each functional unit by executing the program so that the outdoor units 2 function as one outdoor unit as a whole. All or part of the functions of the control unit 4 may be realized using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disk, a ROM, or a CD-ROM, or a storage device such as a hard disk built into a computer system. The program may be transmitted over a telecommunication line.

Specifically, the control unit 4 monitors whether the subject unit (outdoor unit 2) satisfies the defrosting start condition, and causes the subject unit to execute the defrosting operation if the defrosting start condition is satisfied. The defrosting start condition is a condition for determining whether to cause the outdoor unit 2 to execute the defrosting operation, and is determined for individual outdoor units 2. For example, the defrosting start condition can be that the amount of frost formed on the outdoor heat exchanger 21 is equal to or greater than a predetermined threshold value. Here, it is assumed that the outdoor heat exchanger 21 is provided with a frost formation sensor for measuring the frost formation amount. The control unit 4 determines the defrosting start condition of the subject unit on the basis of the measurement data of the frost formation sensor, and causes the subject unit to perform the defrosting operation when the defrosting start condition is satisfied. On the other hand, when the defrosting operation is started in the outdoor unit 2 other than the subject unit, the control unit 4 controls the functional units of the subject unit so that the pressure in the gas pipe is equal to or smaller than a predetermined ratio with respect to the maximum pressure during the heating operation.

Figure 2:
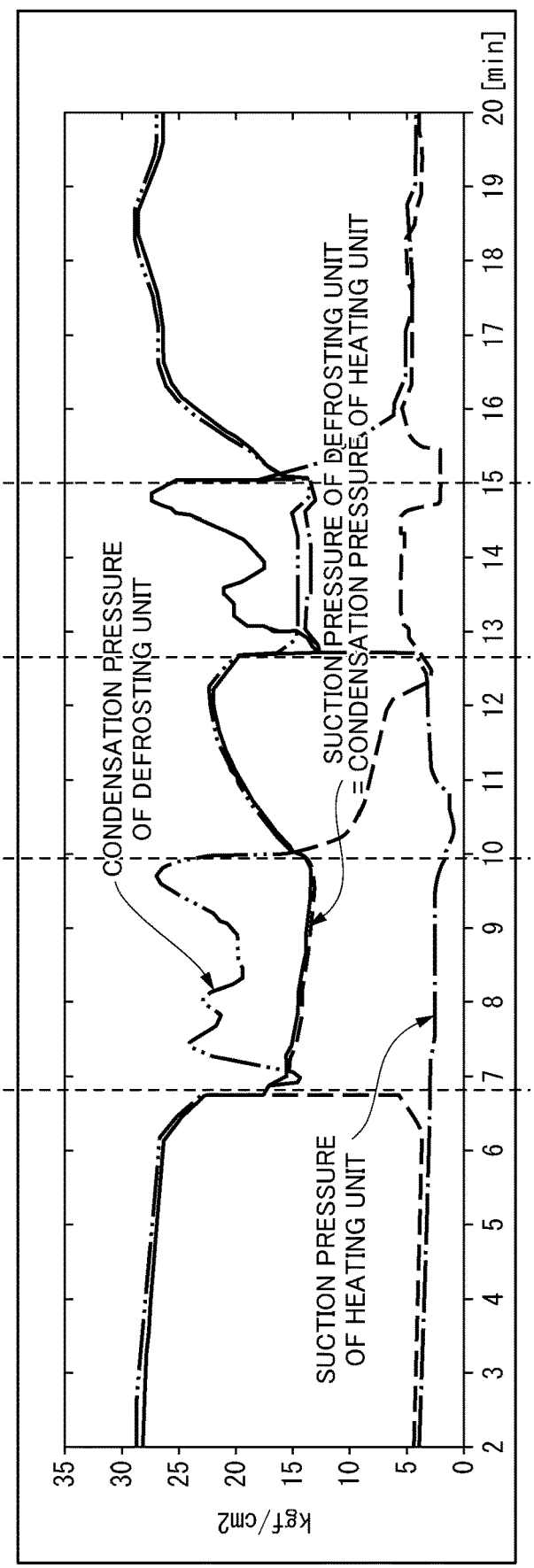
FIG. 2 a diagram showing a specific example of a suction pressure and condensation pressure of each indoor unit when one outdoor unit of an air conditioner including two outdoor units is in a heating operation and the other outdoor unit is in a defrosting operation.

FIG. 2 is a diagram showing a specific example of the suction pressure and condensation pressure of each indoor unit when one outdoor unit of the air conditioner including two outdoor units is in the heating operation and the other outdoor unit is in the defrosting operation. Hereinafter, the outdoor unit in the heating operation is referred to as a "heating unit", and the outdoor unit in the defrosting operation is referred to as a "defrosting unit". As shown in FIG. 2, in a state where one of the two outdoor units functions as a heating unit and the other outdoor unit functions as a defrosting unit, the condensation pressure on the heating unit side becomes equal to the suction pressure on the defrosting unit side. For example, in the example of FIG. 1, the pressure of the refrigerant discharged from the gas pipe by the first outdoor unit 2A is equal to the pressure of the refrigerant sucked from the gas pipe by the second outdoor unit 2B. In this case, higher suction pressure than during the heating operation is applied to the compressor on the defrosting unit side. On the other hand, a predetermined pressure range (hereinafter referred to as "appropriate pressure range") is defined for the compressor as an appropriate operating environment, and operating at a suction pressure exceeding this pressure range may reduce the durability of the compressor.

Therefore, in the air conditioner 1 of the present embodiment, the control unit 4 of each outdoor unit 2 controls the functional units of the subject unit so that the condensation pressure on the heating unit side (=the suction pressure on the defrosting unit side) is equal to or smaller than the pressure (hereinafter referred to as an "upper limit pressure") which is 1/1.5 times the maximum pressure during the heating operation. By setting the condensation pressure on the heating unit side (=the suction pressure on the defrosting unit side) to be equal to or smaller than the upper limit pressure, the suction pressure of the compressor 23 of the defrosting unit can be maintained within an appropriate pressure range. It is assumed that the air conditioner 1 of the present embodiment is provided with a pressure sensor for measuring the condensation pressure on the heating unit side or the suction pressure on the defrosting unit side. Each control unit 4 can observe the condensation pressure on the heating unit side or the suction pressure on the defrosting unit side on the basis of the measurement data acquired from the pressure sensor.

Figure 3:
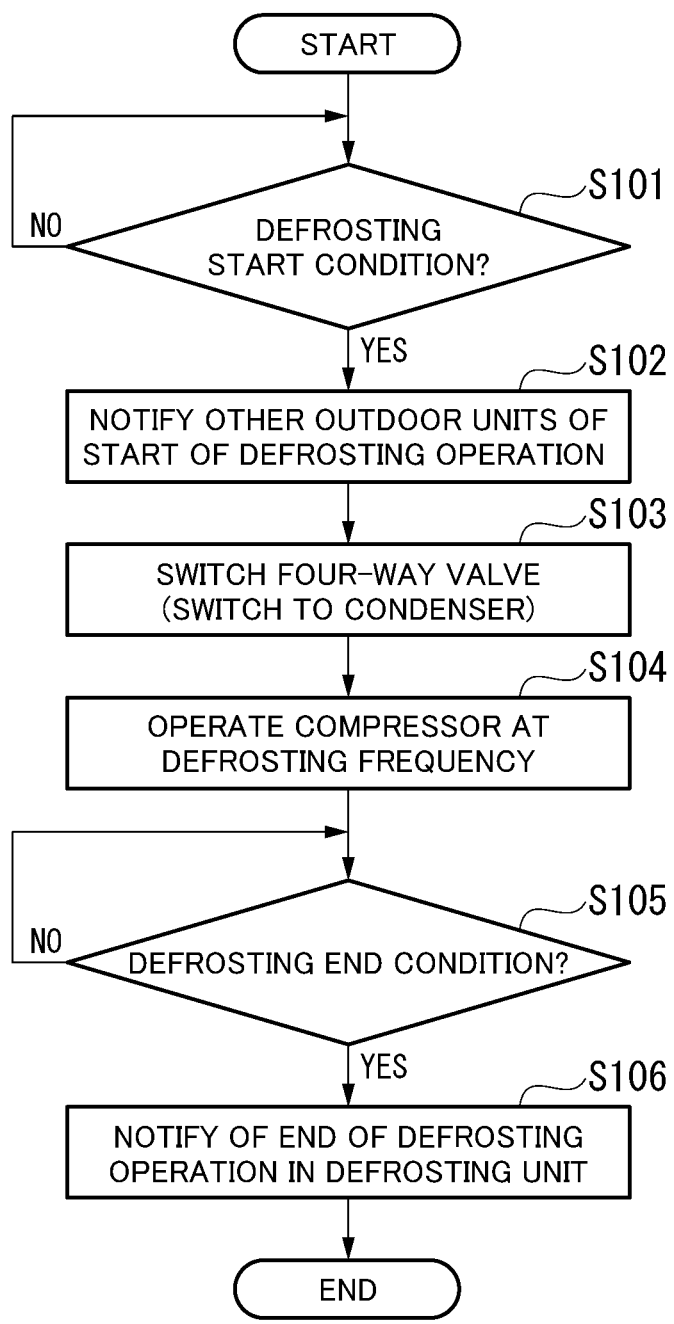
FIG. 3 is a first flowchart showing a specific example of the flow of a condensation pressure control process performed by the air conditioner of the first embodiment.

FIGS. 3 and 4 are flowcharts showing a specific example of the flow of the process (hereinafter referred to as a "condensation pressure control process") of the air conditioner 1 of the first embodiment controlling the outdoor units 2 so that the pressure in the gas pipe is equal to or smaller than the upper limit pressure by adjusting the condensation pressure of the outdoor unit (the heating unit) during the heating operation when any of the outdoor units 2 (the defrosting units) is in the defrosting operation. It is assumed that each flowchart is started in a state where the outdoor unit 2 to be controlled is in the heating operation. First, the flow of control of the outdoor unit 2 serving as the defrosting unit will be described with reference to FIG. 3.

First, the control unit 4 determines whether the subject unit satisfies the defrosting start condition (step S101). When it is determined that the subject unit does not satisfy the defrosting start condition (step S101—NO), the control unit 4 repeatedly executes step S101 until the defrosting start condition is satisfied. On the other hand, when it is determined that the subject unit satisfies the defrosting start condition (step S101—YES), the control unit 4 determines to start the defrosting operation in the subject unit and sends a defrosting operation start notification to the other outdoor unit 2 (that is, the heating unit).

Subsequently, the control unit 4 switches the four-way valve 22 so that the circulation direction of the refrigerant in the subject unit is the direction for the defrosting operation (step S103). After switching the circulation direction of the refrigerant, the control unit 4 operates the compressor 23 at a frequency for the defrosting operation (hereinafter referred to as a "defrosting frequency") (step 3104), thereby causing the subject unit to start the defrosting operation. After the subject unit starts the defrosting operation, the control unit 4 determines whether the subject unit satisfies the defrosting end condition (step S105). The defrosting end condition is a condition for determining whether to end the defrosting operation on the outdoor unit 2. For example, the defrosting end condition can be that the amount of frost formed on the outdoor heat exchanger 21 is smaller than a predetermined threshold value. The control unit 4 determines the defrosting end condition of the subject unit on the basis of the measurement data of the frost formation sensor.

If it is determined that the subject unit does not satisfy the defrosting end condition (step S105—NO), the control unit 4 repeatedly executes step S105 until the defrosting end condition is satisfied. On the other hand, when it is determined that the subject unit satisfies the defrosting end condition (step S105—YES), the control unit 4 determines to end the defrosting operation in the subject unit and sends a defrosting operation end notification to the other outdoor unit 2 (that is, the heating unit).

Next, the flow of control of the outdoor unit 2 serving as the heating unit will be described with reference to FIG. 4. First, the control unit 4 determines whether the defrosting operation start notification has been sent from the defrosting unit (step S201). If it is determined that the defrosting operation start notification has not been sent (step S201—NO), the control unit 4 repeatedly executes step S201 until the defrosting operation start notification is sent.

On the other hand, when it is determined that the defrosting operation start notification has been sent (step S201—YES), the control unit 4 changes the operating frequency of the compressor 23 of the subject unit to the rated maximum frequency (step S202). Here, when the operating frequency is controlled by the target value following method, the maximum frequency may be set to the target value of the operating frequency.

Subsequently, the control unit 4 determines whether the condensation pressure (pressure inside the gas pipe) in the subject unit is equal to or smaller than the upper limit pressure a (step S203). When the condensation pressure is greater than the upper limit pressure a (step S203—NO), the control unit 4 lowers the operating frequency of the compressor 23 (step S204), and returns the process to step S203. Here, while the condensation pressure is greater than the upper limit pressure a, the condensation pressure is adjusted to be equal to or lower than the upper limit pressure a by repeatedly executing step S204.

On the other hand, when the condensation pressure is equal to or lower than the upper limit pressure a (step S203—YES), the control unit 4 determines whether the defrosting operation end notification has been sent from the defrosting unit (step S05). If it is determined that the defrosting operation end notification has not been sent (step S205—NO), the control unit 4 repeatedly executes step S205 until the defrosting operation end notification is sent. On the other hand, when it is determined that the defrosting operation end notification has been sent (step S205—YES), the control unit 4 ends the condensation pressure control process.

The air conditioner 1 according to the first embodiment configured as described above includes a plurality of outdoor units 2 and one or more indoor units 3, and includes a control unit that controls the condensation pressure of the outdoor unit in the heating operation or the suction pressure of the outdoor unit in the defrosting operation to be equal to or smaller than the upper limit pressure (1/1.5 times the rated maximum pressure during the heating operation) when any of the outdoor units is in the defrosting operation. In this way, since the air conditioner 1 can reduce the pressure in the gas pipe during the defrosting operation to be lower than that during the normal heating operation, it is possible to inhibit application of an excessive load to the compressor due to the defrosting operation.

Modification Example

In the condensation pressure control process of FIG. 4, when it is expected that the condensation pressure will be greater than the upper limit pressure a from the state where the condensation pressure is equal to or smaller than the upper limit pressure a, the control unit 4 may return the process to step S203 in step S205-NO.

The control unit 4 of the heating unit may be configured to control the condensation pressure of the subject unit to be a pressure at which the saturation temperature becomes 30° C. or higher when an indoor blower 33 of any of the indoor units 3 is in operation. According to such a configuration, the air conditioner 1 can supply warm air instead of cold air to the room even when any of the outdoor units 2 is in the defrosting operation.

The control unit 4 of the heating unit may be configured to control the condensation pressure of the subject unit to be a pressure at which the saturation temperature is smaller than 30° C. when the indoor blower 33 in any of the indoor units 3 is stopped. According to such a configuration, the air conditioner 1 can reduce the pressure of the refrigerant supplied to the compressor 23 by suppressing the supply of warm air to the room. Therefore, it is possible to reduce the risk that the compressor 23 of the heating unit will break down during the defrosting operation.

When the defrosting unit is performing the defrosting operation, the control unit 4 of the heating unit may be configured to make the opening degree of the outdoor expansion valve 24 of the subject unit smaller than the opening degree when the defrosting unit is performing the normal heating operation. The normal heating operation here means a heating operation when the outdoor unit 2 in the defrosting operation is not present. Generally, since cooled the liquid refrigerant flows from the defrosting unit into the heating unit, so-called liquid back may occur and the compressor 23 may break down when the heating operation is performed with the opening degree of the outdoor expansion valve 24 set to the same opening as during the normal heating operation. Therefore, by making the opening degree of the outdoor expansion valve 24 of the heating unit smaller than the opening degree during the normal heating operation, it is possible to prevent the compressor 23 from breaking down.

The air conditioner 1 of the first embodiment controls the pressure in the gas pipe (equal to the condensation pressure of the heating unit or the suction pressure of the defrosting unit) by adjusting the operating frequency of the compressor 23 of the heating unit. However, alternatively, the air conditioner 1 may be configured to control the pressure in the gas pipe by adjusting the operating frequency of the compressor 23 of the defrosting unit.

Second Embodiment

The air conditioner 1 of the second embodiment is different from the air conditioner 1 of the first embodiment only in that the control unit 4 has a function of controlling the number of defrosting units and the number of heating units. The other configurations are the same as that of the air conditioner 1 of the first embodiment. Therefore, in the following, the illustration of the configuration of the air conditioner 1 of the second embodiment will be omitted by referring to FIG. 1 as necessary.

By sharing the operating state with the control unit 4 of the other outdoor unit 2, the control unit 4 controls the number of operating outdoor units 2 so that the number of defrosting units and the number of heating units are the same or different by one. For example, when there are five outdoor units 2 and one outdoor unit 2 is in the defrosting operation, the control unit 4 controls the number of outdoor units 2 in the heating operation to be one or two. Further, for example, when there are five outdoor units 2 and two outdoor units 2 are in the defrosting operation, the control unit 4 controls the number of outdoor units 2 in the heating operation to be any one of one to three. Further, for example, when there are five outdoor units 2 and three outdoor units 2 are in the defrosting operation, the control unit 4 controls the number of outdoor units 2 in the heating operation to be two.

Generally, if the number of defrosting units is too large, the amount of heat required for defrosting is insufficient and the defrosting time becomes long. On the other hand, if the number of heating units is too large, the pressure in the gas pipe becomes higher than necessary, and the risk of failure of the compressor on the defrosting unit side increases.

In regard to such a problem, the air conditioner 1 of the second embodiment can control the pressure in the gas pipe to be equal to or smaller than the upper limit pressure by adjusting the number of defrosting units and the number of heating units. Therefore, according to the air conditioner 1 of the second embodiment, it is possible to inhibit the application of an excessive load to the compressor due to the defrosting operation.

Modification Example

The control unit 4 may be configured so that two groups including the defrosting unit and the heating unit alternately perform the defrosting operation. For example, when there are four outdoor units 2 of A, B, C, and D, the control units 4 of the four outdoor units 2 may operate in cooperation with each other, for example, so that the groups {A, B} and {C, D} alternately perform the defrosting operation. Further, for example, the control unit 4 may be configured such that the defrosting unit and the heating unit are replaced in each defrosting operation of each outdoor unit 2 in each group. According to such a configuration, since it is possible to suppress the frequent defrosting operation in the air conditioner 1, the total time of the heating operation can be made longer than that when the defrosting operation is performed in the individual outdoor units 2.

In the first embodiment and the second embodiment, the mode in which the condensation pressure control process is performed by the control unit 4 of each outdoor unit 2 has been described, but this process does not necessarily have to be performed by the control unit of each outdoor unit 2. For example, the air conditioner 1 may be configured such that one main control unit 4 of the control units 4 of the outdoor units 2 executes the condensation pressure control process. In this case, the other control units 4 may operate according to the instruction of one main control unit 4. The air conditioner 1 may include a second control unit different from the control unit included in the outdoor unit 2. In this case, for example, the air conditioner 1 may be configured such that the second control unit executes the condensation pressure control process. In this case, the control unit 4 of the outdoor unit 2 may operate according to the instruction of the second control unit.

A part or all of the air conditioner 1 of the above-described embodiment may be realized by a computer. In that case, the program for realizing this function may be recorded on a computer-readable recording medium, and the program recorded on the recording medium may be read and executed by a computer system. The term "computer system" as used herein includes an OS and hardware such as peripheral devices. The "computer-readable recording medium" refers to a portable medium such as a flexible disk, a magneto-optical disk, a ROM, or a CD-ROM, or a storage device such as a hard disk built into a computer system. Further, the "computer readable recording medium" may include a medium configured to hold the program dynamically for a short period of time like a communication line when the program is transmitted over a network such as the Internet and a communication circuit such as a telephone line and a medium configured to hold the program for a certain period of time like a volatile memory inside a computer system serving as a server and a client in that case. Furthermore, the program may be used to realize some of the above-described functions. In addition, the above-described functions may be realized using a combination with a program which is already recorded in a computer system and may be realized using a programmable logic device such as a field programmable gate array (FPGA).

According to at least one embodiment described above, the air conditioner includes a plurality of outdoor units each including a compressor, a four-way valve, an outdoor heat exchanger, an outdoor expansion valve, and an outdoor blower, the outdoor unit exchanging heat between outdoor air and refrigerant; one or more indoor units each being connected to the plurality of outdoor units by a refrigerant pipe, including an indoor heat exchanger, an indoor expansion valve, and an indoor blower, the indoor unit exchanging heat between indoor air and refrigerant; and a control unit that controls the plurality of outdoor units and the one or more indoor units, the control unit controlling condensation pressure of an outdoor unit in a heating operation or suction pressure of an outdoor unit in a defrosting operation to be equal to or smaller than an upper limit pressure which is 1/1.5 times the rated maximum pressure during the heating operation when any of the outdoor units is in the defrosting operation. Due to this, it is possible to inhibit the application of an excessive load to the compressor due to the defrosting operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An air conditioner comprising:
   a plurality of outdoor units each including a compressor, a four-way valve, an outdoor heat exchanger, an outdoor expansion valve, and an outdoor blower, each outdoor unit exchanging heat between outdoor air and a refrigerant;
   one or more indoor units each being connected to the plurality of outdoor units by a refrigerant pipe, including an indoor heat exchanger, an indoor expansion valve, and an indoor blower, each indoor unit exchanging heat between indoor air and the refrigerant; and
   a control unit that controls the plurality of outdoor units and the one or more indoor units, wherein
   the control unit controls condensation pressure of one or more outdoor units that are in a heating operation among the plurality of the outdoor units and suction pressure of one or more outdoor units that are in a defrosting operation among the plurality of the outdoor units such that they are equal to or smaller than an upper limit pressure which is two thirds times the rated maximum pressure.

2. The air conditioner according to claim 1, wherein the control unit controls the condensation pressure of the outdoor unit in the heating operation such that it is a pressure at which a saturation temperature becomes 30° C. or higher when an indoor blower of any of the indoor units is in operation.

3. The air conditioner according to claim 1, wherein the control unit controls the condensation pressure during the heating operation such that it is a pressure at which a saturation temperature is smaller than 30° C. when the indoor blower is stopped in any of the indoor units.

4. The air conditioner according to claim 1, wherein the control unit controls the condensation pressure of the outdoor unit to be equal to or lower than the upper limit pressure by adjusting an operating frequency of the compressor of the outdoor unit in the heating operation.

5. The air conditioner according to claim 1, wherein the control unit controls the suction pressure of the outdoor unit to be equal to or lower than the upper limit pressure by adjusting an operating frequency of the compressor of the outdoor unit during the defrosting operation.

6. The air conditioner according to claim 1, wherein the control unit controls the number of operating outdoor units so that the number of outdoor units in the defrosting operation and the number of outdoor units in the heating operation are the same or different by one.

7. The air conditioner according to claim 1, wherein the control unit performs control such that two groups each including an outdoor unit performing the defrosting operation and an indoor unit performing the heating operation alternately perform the defrosting operation.

8. The air conditioner according to claim 1, wherein the control unit makes an opening degree of the outdoor expansion valve of the outdoor unit performing the heating operation smaller than an opening degree when the outdoor unit is performing a normal heating operation when any of the outdoor units is in the defrosting operation.

9. A control method of an air conditioner including:
a plurality of outdoor units each including a compressor, a four-way valve, an outdoor heat exchanger, an outdoor expansion valve, and an outdoor blower, each outdoor unit exchanging heat between outdoor air and a refrigerant; and
one or more indoor units each being connected to the plurality of outdoor units by a refrigerant pipe, including an indoor heat exchanger, an indoor expansion valve, and an indoor blower, each indoor unit exchanging heat between indoor air and the refrigerant, the method comprising:
controlling condensation pressure of one or more outdoor units that are in a heating operation among the plurality of the outdoor units and suction pressure of one or more outdoor units in a defrosting operation among the plurality of the outdoor units such that they are equal to or smaller than an upper limit pressure which is two thirds times a rated maximum pressure.

* * * * *